(12) United States Patent
Mandier et al.

(10) Patent No.: US 12,531,571 B2
(45) Date of Patent: Jan. 20, 2026

(54) DIGITAL TO ANALOG CONVERTER

(71) Applicants: STMicroelectronics (Crolles 2) SAS, Crolles (FR); STMicroelectronics (Grenoble 2) SAS, Grenoble (FR)

(72) Inventors: Christophe Mandier, Fontanil Cornillon (FR); Matteo Maria Vignetti, Aix les Bains (FR)

(73) Assignees: STMicroelectronics (Crolles 2) SAS, Crolles (FR); STMicroelectronics (Grenoble 2) SAS, Grenoble (FR)

( * ) Notice: Subject to any disclaimer, the term of this patent is extended or adjusted under 35 U.S.C. 154(b) by 234 days.

(21) Appl. No.: 18/390,907

(22) Filed: Dec. 20, 2023

(65) Prior Publication Data

US 2024/0214000 A1    Jun. 27, 2024

(30) Foreign Application Priority Data

Dec. 21, 2022  (FR) ..................... 2214121

(51) Int. Cl.
*H03M 1/66* (2006.01)
*H04N 25/78* (2023.01)

(52) U.S. Cl.
CPC .............. *H03M 1/66* (2013.01); *H04N 25/78* (2023.01)

(58) Field of Classification Search
None
See application file for complete search history.

(56) References Cited

U.S. PATENT DOCUMENTS

2017/0350756 A1    12/2017  Panicacci
2020/0260037 A1*   8/2020   Cho ..................... H04N 25/618
2022/0272291 A1*   8/2022   Mas ..................... G01S 7/4863

* cited by examiner

*Primary Examiner* — Mark T Monk
(74) *Attorney, Agent, or Firm* — SLATER MATSIL, LLP

(57) ABSTRACT

The present disclosure relates to a DAC that includes: a first pixel including a first transfer gate coupling a memory node of the first pixel and a capacitive sensing node (SN); a second pixel comprising a first transfer gate coupling a memory node of the second pixel and the capacitive SN; a reset transistor coupling the sensing node to a first voltage supply rail; and a control circuit configured to store electrical charge by activating the reset transistor to apply a reference voltage to the memory node of each of the first and second pixels; and generate a voltage of the DAC at the sensing node by deactivating the reset transistor and controlling the first transfer gates of the first and second pixels to transfer the charge stored.

20 Claims, 11 Drawing Sheets

DIGITAL TO ANALOG CONVERTER

CROSS-REFERENCE TO RELATED APPLICATIONS

This application claims the priority benefit of French patent application number FR 2214121, filed on Dec. 21, 2022, entitled "Digital to analog converter," which is hereby incorporated by reference to the maximum extent allowable by law.

TECHNICAL FIELD

The present disclosure relates generally to digital to analog converters (DACs) and to ramp generators comprising DACs.

BACKGROUND

DACs are for example used in image sensors to generate a voltage ramp. For example, analog to digital converters (ADCs) in image sensors are often implemented by ramp converters, that comprise a comparator configured to compare the voltage ramp with a voltage signal generated by the light sensitive elements of each pixel of the image sensor. Existing DACs tend to suffer from relatively high noise due to their inner resistivity and/or capacitance. Furthermore, solutions implemented in known DAC architectures for reducing noise lead to a higher current consumption. Existing DAC solutions also tend to occupy significant chip area, adding significantly to the surface area of pixel arrays.

SUMMARY

There is a need for a DAC having relatively low noise and current consumption.

One or more embodiments may address all or some of the drawbacks of known DACs.

One or more embodiments may provide a digital to analog converter that includes at least a first pixel comprising a first transfer gate coupling a memory node of the first pixel and a capacitive sensing node; at least a second pixel comprising a first transfer gate coupling a memory node of the second pixel and the capacitive sensing node; a reset transistor coupling the sensing node to a first voltage supply rail; and a control circuit configured to: store electrical charge at each of the memory nodes by activating the reset transistor to apply a reference voltage to the memory node of each of the first and second pixels; and generate an output voltage of the DAC at the sensing node by deactivating the reset transistor and controlling, based on a digital input signal, the first transfer gates of the first and second pixels to transfer the charge stored at the memory nodes to the sensing node.

One or more embodiments may provide a method of digital to analog conversion by a digital to analog converter, the method that includes storing electrical charge, by a control circuit of the DAC, at a memory node of a first pixel and at a memory node of a second pixel, the first pixel comprising a first transfer gate coupling the memory node of the first pixel and a capacitive sensing node, the second pixel comprising a first transfer gate coupling the memory node of the second pixel and the capacitive sensing node, by activating a reset transistor, to apply a reference voltage to the memory node of each of the first and second pixels, the reset transistor coupling the sensing node to a first voltage supply rail; generating, by the control circuit, an output voltage of the DAC at the sensing node by deactivating the reset transistor, and controlling, based on a digital input signal, the first transfer gates of the first and second pixels to transfer the charge stored at the memory nodes to the sensing node.

According to an embodiment, after applying the reference voltage to the memory nodes and prior to deactivating the reset transistor, a method may include controlling by the control circuit the reset transistor and the first voltage supply rail to apply an initial voltage to the sensing node while the memory nodes of the first and second pixels are insulated from the sensing node by the first transfer gates.

According to an embodiment, the first pixel comprises a second transfer gate coupling the memory node of the first pixel to an input node of the first pixel; and the second pixel comprises a second transfer gate coupling the memory node of the second pixel to an input node of the second pixel; wherein storing the electrical charge at each of the memory nodes further comprises, prior to activating the reset transistor, controlling, by the control circuit, the second transfer gate of the first pixel to prevent transfer of charge between the memory node of first pixel and the input node of the first pixel and controlling, by the control circuit, the second transfer gate of the second pixel to prevent transfer of charge between the memory node of the second pixel and the input node of second pixel.

According to an embodiment, the first pixel comprises a constant potential barrier separating the memory node of the first pixel from the second transfer gate of the first pixel; and the second pixel comprises a constant potential barrier separating the memory node of the second pixel from the second transfer gate of the second pixel; wherein storing the electrical charge at each of the memory nodes further comprises, prior to controlling the first transfer gates of the first and second pixels to transfer the charge stored at the memory nodes to the sensing node, controlling, by the control circuit, the second transfer gate of the first pixel to obtain a transfer of a partial amount of the charge stored at the memory node of the first pixel, over the constant potential barrier, to the input node of the first pixel and controlling, by the control circuit, the second transfer gate of the second pixel to obtain a transfer of a partial amount of the charge stored at the memory node of the second pixel, over the constant potential barrier, to the input node of the second pixel.

According to an embodiment, the first pixel comprises a third transfer gate coupling a second voltage supply rail to the input node of the first pixel; and the second pixel comprises a third transfer gate coupling the second voltage supply rail to the input node of the second pixel; wherein storing the electrical charge at each of the memory nodes further comprises, prior to controlling the first transfer gates of the first and second pixels to transfer the charge stored at the memory nodes to the sensing node, controlling, by the control circuit, the third transfer gate and the second voltage supply rail of the first pixel to transfer the partial amount of charge from the input node of the first pixel to the second voltage supply rail, and controlling, by the control circuit, the third transfer gate and the second voltage supply rail of the second pixel to transfer the partial amount of charge from the input node of the second pixel to the second voltage supply rail.

According to an embodiment, the first and the second pixels each comprise a diode, the anode of the diode being coupled to a ground potential, the cathode of the diode of the first pixel being coupled to the memory node of the first pixel, and the cathode of the diode of the second pixel being coupled to the memory node of the second pixel.

According to an embodiment, the first and second pixels of the DAC each comprise a photodiode, the anode of the photodiode being coupled to a further voltage supply rail, the cathode of the diode of the first pixel being coupled to the input node of the first pixel, and the cathode of the diode of the second pixel being coupled to the input node of the second pixel.

One or more embodiments may provide a ramp generator comprising a digital to analog converter, in which the control circuit is configured to generate a voltage ramp at the sensing node by activating sequentially the first transfer gates of the first and second pixels to transfer the charge stored at the memory node of the first pixel to the sensing node prior to transferring the charge stored at the memory node of the second pixel to the sensing node.

According to an embodiment of the ramp generator, the DAC comprises N pixels including the first and second pixels, N being an integer equal to at least 3, each of the N pixels comprising a first transfer gate coupling a memory node of the pixel and the capacitive sensing node, wherein the control circuit is configured to generate a voltage ramp at the sensing node by controlling the first transfer gates of the N pixels to transfer sequentially the charge stored at the memory node of each of the N pixels to the sensing node.

According to an embodiment of the ramp generator, the DAC comprises N pixels including the first and second pixels, N being an integer equal to at least 3, each of the N pixels comprising a first transfer gate coupling a memory node of the pixel and the capacitive sensing node, wherein the control circuit is configured to generate a voltage ramp at the sensing node by activating sequentially the first transfer gates of sets of the N pixels to transfer the charge stored at the memory node of one of the sets of pixels to the sensing node prior to transfer the charge stored at the memory node of another of the sets of pixels to the sensing node.

According to an embodiment of the ramp generator, the ramp generator comprises an impedance buffer coupled between the sensing node and a DAC buffer conduction rail, the DAC buffer conduction rail being coupled to all pixels of the DAC.

According to an embodiment of the ramp generator, the impedance buffer comprises a first transistor and a second transistor coupled in series with each other and coupling a third voltage supply rail to the DAC buffer conduction rail, a control node of the first transistor being coupled to the sensing node and a main conduction node of the second transistor being coupled to the DAC buffer conduction rail.

One or more embodiments may provide an image sensor that includes the ramp generator as described above; an array of pixels configured to transform incoming light into an output signal representative of the amount of incoming light, the pixels having their outputs coupled together to an impedance buffer and to a common sensor conduction rail; and a comparator having a first input capacitively coupled to the DAC buffer conduction rail and a second inverting input capacitively coupled to the sensor conduction rail, the comparator being configured to provide, at an output of the comparator, a signal indicating when a signal on the DAC buffer conduction rail crosses a signal on the sensor conduction rail.

According to an embodiment of the image sensor, the ramp generator is configured to generate, on the DAC buffer conduction rail, a monotonically increasing or monotonically decreasing voltage ramp; the image sensor further comprises another ramp generator as described above and which is configured to generate an offset voltage ramp on an offset ramp rail capacitively coupled to the second input of the comparator, the offset voltage ramp being either a monotonically increasing voltage ramp in the case that the voltage ramp on the DAC buffer conduction rail is monotonically increasing, or a monotonically decreasing voltage ramp in the case that the voltage ramp on the DAC buffer conduction rail is monotonically decreasing.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1A:
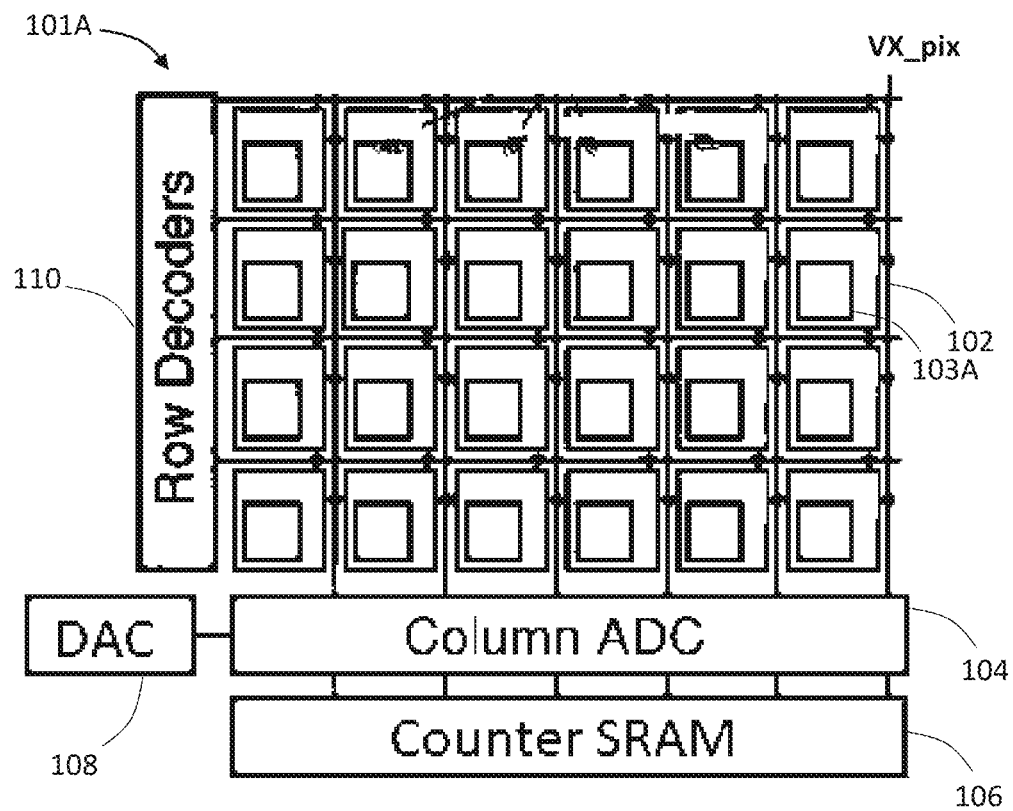
FIG. 1A schematically illustrates an image sensor according to an example embodiment.

FIG. 1A schematically illustrates an image sensor 101A according to an example embodiment. The image sensor 101A comprises, for example, an array 102 of pixels 103A, which are arranged at crossing points between column output conductors VX_pix and row control conductors of the array. The image sensor 101A further comprises a row decoder circuit 110 (Row Decoders), which is for example controlled by a control unit (not illustrated in FIG. 1A), and a column circuit comprising column analogic to digital converters (Column ADC) circuits 104, for example one per column, outputting digital signals representing light illuminating the image sensor 101A. The ADC circuits are, for example, coupled to counter and memory circuits 106 (Counter SRAM) storing values read from the various pixels of the sensor. The image sensor 101A for example further comprises at least one DAC 108 configured to provide an analog voltage signal, comprising, for example, an analog voltage ramp, to the ADCs 104. For example, the analog voltage ramp is generated by the DAC 108 based on a digital signal provided, for example, by the control unit or a control circuit of the DAC.

According to a conventional approach, the DAC 108 comprises a plurality of resistances connected in series between a supply voltage rail and ground, or a plurality of capacitors connected in parallel to a supply voltage rail, and switches for selectively connecting the resistors or capacitors to the DAC output according to a time sequence in order to obtain a voltage ramp. A drawback with such conventional DAC architectures is that they generally introduce additional noise in the image due to noise present in the voltage ramp. A way to reduce this additional noise is to increase the current consumption or increase the area of the capacitance, which is generally undesirable.

Figure 1B:
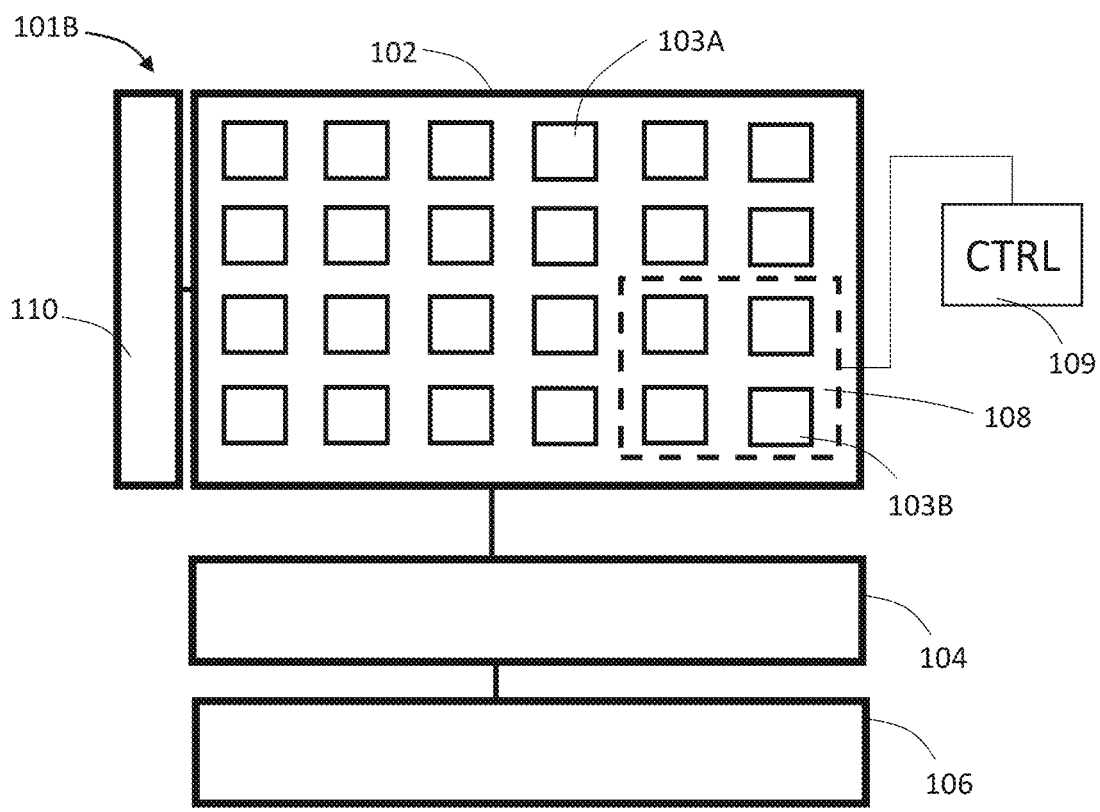
FIG. 1B schematically illustrates an image sensor according to an embodiment of the present disclosure.

FIG. 1B schematically illustrates an image sensor 101B according to an embodiment of the present disclosure.

The image sensor 101B of FIG. 1B is similar to the image sensor 101A of FIG. 1A, and like features are labelled with like reference numerals, and will not be described again in detail. However, in one or more embodiments, the DAC 108 of the image sensor 101B is implemented by using pixels 103B of the array 102. In particular, in one or more embodiments, pixels 103A of the array 102 are imaging pixels used to capture an image, whereas pixels 103B of the array 102 are DAC elements used to generate an analog voltage based on a digital input signal. In one or more embodiments, the pixels 103B have a structure similar to the pixels 103A of the array 102, except that the pixels 103B are controlled by a control circuit 109 (CTRL) so that they operate as a DAC. Furthermore, in one or more embodiments, the pixels 103B are interconnected differently to the pixels 103A, as will be described in more detail below. In one or more embodiments, the pixels 103B of the DAC of FIG. 1B do not use light to function, and are for example blinded from the image scene. In one or more embodiments, the pixels 103B of the DAC of the FIG. 1B take advantage of all or part of the pixel structure to produce a controlled charge transfer to a conductor VX_pix. Pixels 103A and pixels 103B share, for example, at least some voltage supply rails. In one or more embodiments, the pixels 103B are called pixels herein, even if they do not capture pixel information, in view of the fact that they form part of the pixel array 102, and have a similar structure to the imaging pixels of the array 102, which is an aspect that is exploited in one or more embodiments of the present disclosure.

The pixels 103B of the DAC 108 of the FIG. 1B are, for example, arranged in a same area of the array 102 as the area in which the pixels 103A of the image sensor are implemented. While FIG. 1B illustrates an example in which the DAC 108 is implemented by a two-by-two group of pixels 103B in the bottom right corner of the array 102, more generally, in one or more embodiments, the DAC 108 is implemented using pixels 103B arranged in one or more columns of the array 102 and/or using pixels 103B arranged in one or more rows of the array 102. The number of pixels 103B used to implement the DAC 108 may be, for example, chosen as a function of the desired voltage amplitude and step granularity of the analog voltage signal to be generated by the DAC 108. In one or more embodiments, with the structure of the pixels 103B of the DAC and the structure of the pixels 103A being similar, the fabrication costs are relatively low. Furthermore, as will become apparent from the following description, in one or more embodiments, noise introduced by the DAC is also relatively low and can be controlled by adjusting the number of pixel DAC units. As an example, the greater the number of pixel DAC units, the lower the noise.

Figure 2:
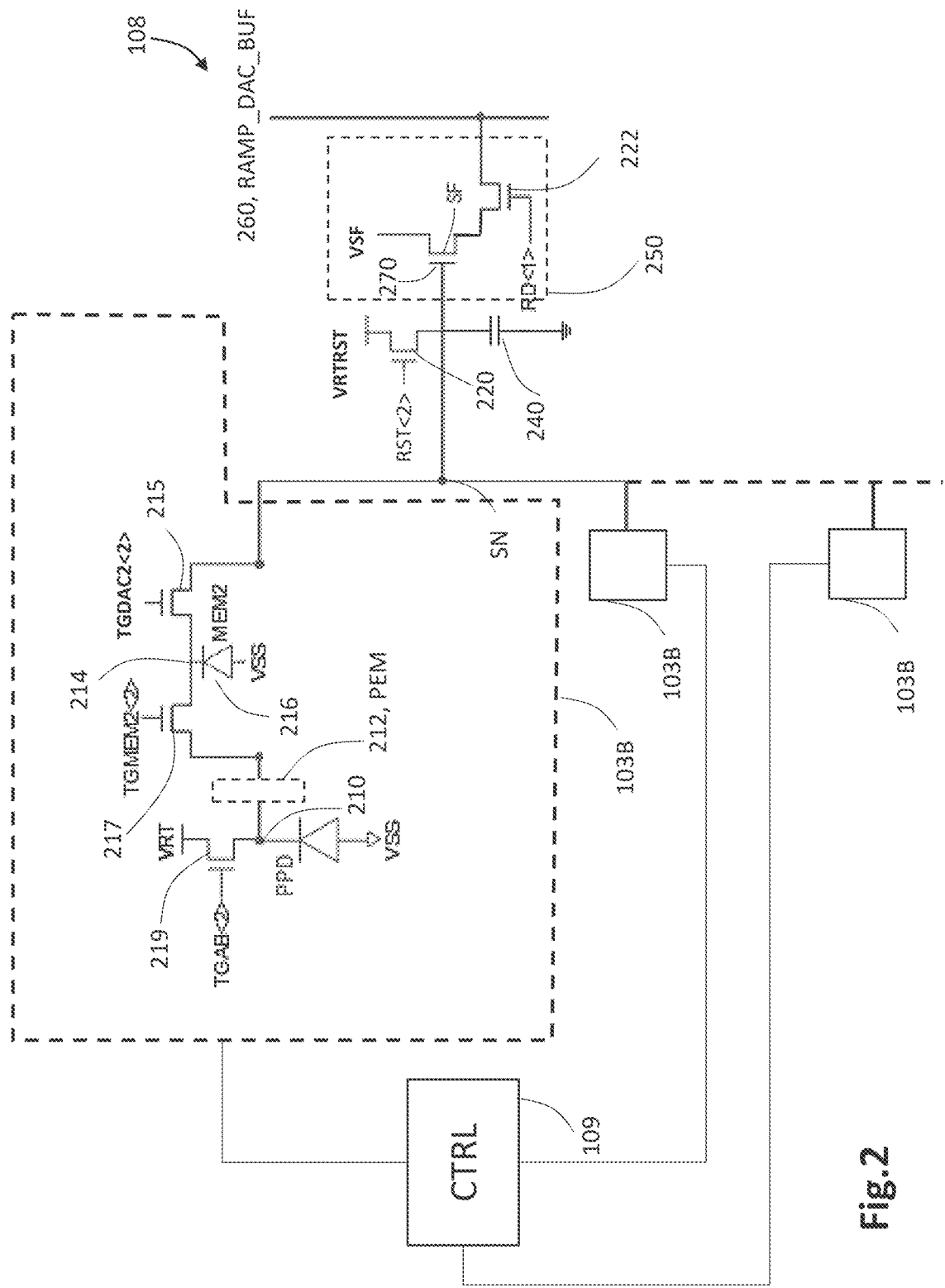
FIG. 2 schematically illustrates a DAC according to an embodiment of the present disclosure.

FIG. 2 schematically illustrates the DAC 108 of FIG. 1B in more detail according to an example embodiment of the present disclosure.

In one or more embodiments, the DAC 108 of FIG. 2 comprises a first pixel 103B. In one or more embodiments, the first pixel 103B comprises a first transfer gate 215 controlled by a control signal TGDAC2<2>, coupling a memory node 214 of the first pixel 103B and a sensing node SN of the DAC. The control signal TGDAC2<2> is generated, for example, by a control circuit 109 (CTRL). The control circuit 109 is, for example, implemented outside the array 102, in the DAC or in an image sensor comprising the DAC. The sensing node SN is, for example, capacitively coupled to a ground potential via a capacitor 240.

In the example of FIG. 2, the first pixel 103B comprises a diode 216 (MEM2), the anode of the diode being coupled, for example, to a VSS potential and the cathode of the diode being coupled to the memory node 214. In one or more embodiments, the diode 216 provides one possible solution for allowing charge storage at the memory node 214. In alternative embodiments, another charge storage device, such as a capacitor configured to control the level of electrons, could be used instead of the diode 216.

In the example of FIG. 2, the DAC 108 comprises, for example, a reset transistor 220 coupling the sensing node SN to a first voltage supply rail VRTRST. The first voltage supply rail VRTRST is configured, for example, to supply a voltage VRT or a reference voltage VLOW when controlled, for example, by the control circuit 109. The reset transistor 220 receives at its control node a control signal RST<2> generated, for example, by the control circuit 109.

In the example of FIG. 2, the first pixel 103B comprises an optional second transfer gate 217, controlled by a control signal TGMEM2<2>, the second transfer gate 217 coupling the memory node 214 of the first pixel 103B to an optional input node 210 of the first pixel 103B.

In the example of FIG. 2, the first pixel 103B comprises an optional constant potential barrier 212 (PEM) coupling the memory node 214 of the first pixel to the second transfer gate 217 of the first pixel 103B. The constant potential barrier 212 is, for example, implemented by specific process steps, such as by doping the substrate in the region of the potential barrier and is possibly used to control the number of electrons inside node MEM2.

In the example of FIG. 2, the first pixel comprises an optional third transfer gate 219, controlled by a control signal TGAB<2>, the third transfer gate 219 coupling a second voltage supply rail VRT to the input node 210 of the first pixel 103B.

In the example of FIG. 2, the first pixel 103B may comprise an optional photodiode PPD. The anode of the photodiode PPD is coupled to a VSS voltage rail and the cathode of the photodiode PPD is coupled to the input node 210. In an example, the photodiode is shielded, for example in an upper metal level, to prevent light from generating unwanted charges in the photodiode.

In one or more embodiments, the DAC of FIG. 2 comprises, for example, second and third further pixels 103B that are each similar to the first pixel 103B, and for ease of illustration, are not shown in detail in FIG. 2. The DAC may further comprise additional pixels 103B not illustrated.

In a non-illustrated example, the DAC may comprise X pixel DAC units similar to the first pixel 103B, with X being an integer of one or more for an LSB (Least Significant Bit) generation. The number of pixels X may be, for example, chosen as function of noise specifications of the circuit. The number X of pixels may be, for example, greater than thirty, and greater than one thousand (or 10 bits) in some embodiments, or even more if a DAC with a better precision is desired. The X pixels of the DAC are, for example, shorted to the same sensing node SN.

In the example of FIG. 2, the reset transistor 220, the sensing node SN and the capacitor 240 are common to all pixels of the DAC 108. In another example, the sensing node SN is common to all pixels of the DAC, but a different reset transistor 220 is coupled to the sensing node SN in each pixel row.

In an example, the control circuit 109 is configured to control all the pixels of the DAC 108.

The DAC of FIG. 2 comprises, for example, an impedance buffer 250 configured to couple the sensing node SN to a DAC buffer conduction rail 260 (RAMP_DAC_BUF). The impedance buffer 250 comprises, for example, a first transistor 270 (SF) and a second transistor 222 coupled in series with each other between a third voltage supply rail VSF and the DAC buffer conduction rail 260. The control node of the first transistor 270 is, for example, coupled to the sensing node SN. A main conduction node, for example the source, of the second transistor 222 is, for example, coupled to the DAC buffer conduction rail 260.

The control circuit 109 is, for example, configured to store electrical charge at each of the memory nodes 214 of the pixels 103B of the DAC 108 by activating the reset transistor 220 to apply the reference voltage VLOW to the memory node 214 of each of the pixels of the DAC 108.

The control circuit 109 may be, for example, further configured to generate an output voltage of the DAC 108 at the sensing node SN by deactivating the reset transistor 220 and controlling, based on a digital input signal, generated for example by the control circuit 109, selected ones of the first transfer gates 215 of the pixels 103B of the DAC 108 in order to transfer the charge stored at the memory nodes 214 to the sensing node SN.

In one or more embodiments, in the case where the DAC 108 is configured as a ramp generator, the control circuit 109 is configured to generate a voltage ramp at the sensing node SN by activating sequentially the first transfer gates 215 of the pixels of the DAC 108 to transfer the charge stored at the memory node 214 of the first pixel to the sensing node SN prior to then transferring the charge stored at the memory node 214 of the second pixel to the sensing node SN, and prior to then transferring the charge stored at the memory node 214 of the third pixel to the sensing node SN, and so on and so forth.

In an example according to which the DAC 108 comprises N pixels similar to the first pixel 103B, the control circuit 109 is, for example, configured to generate a voltage ramp at the sensing node SN by controlling the first transfer gates 215 of the N pixels to transfer sequentially the charge stored at the memory node 214 of each of the N pixels to the sensing node SN.

In another example in which the DAC 108 comprises N pixels similar to the first pixel 103B, the control circuit 109 is configured to generate a voltage ramp at the sensing node SN by activating sequentially the first transfer gates 215 of different sets of the N pixels to transfer the charge stored at the memory node 214 of one of the sets of pixels to the sensing node SN prior to transfer the charge stored at the memory node 214 of another of the sets of pixels to the sensing node SN.

In one or more embodiments, the DAC 108 of FIG. 2 has a relatively low DC current consumption and line noise, because the DAC is implemented near the pixels 103A, for example inside the array of pixels 102. In one or more embodiments, the DAC 108 of FIG. 2 may improve the differential linearity (DNL) and increase the power supply rejection ratio (PSRR), because the pixels and the DAC are coupled and have a similar lay out. Furthermore, in an example in which the image sensor of FIG. 1B is implemented using stacked tiers, a top tier comprising the photodiodes PPD, and the bottom tier comprising the transistors of the pixel, the DAC 108 may lead to a surface area reduction in the bottom die. In one or more embodiments, the DAC buffering is directly done by the transistor SF, which leads to a linearity correction.

Figure 3:
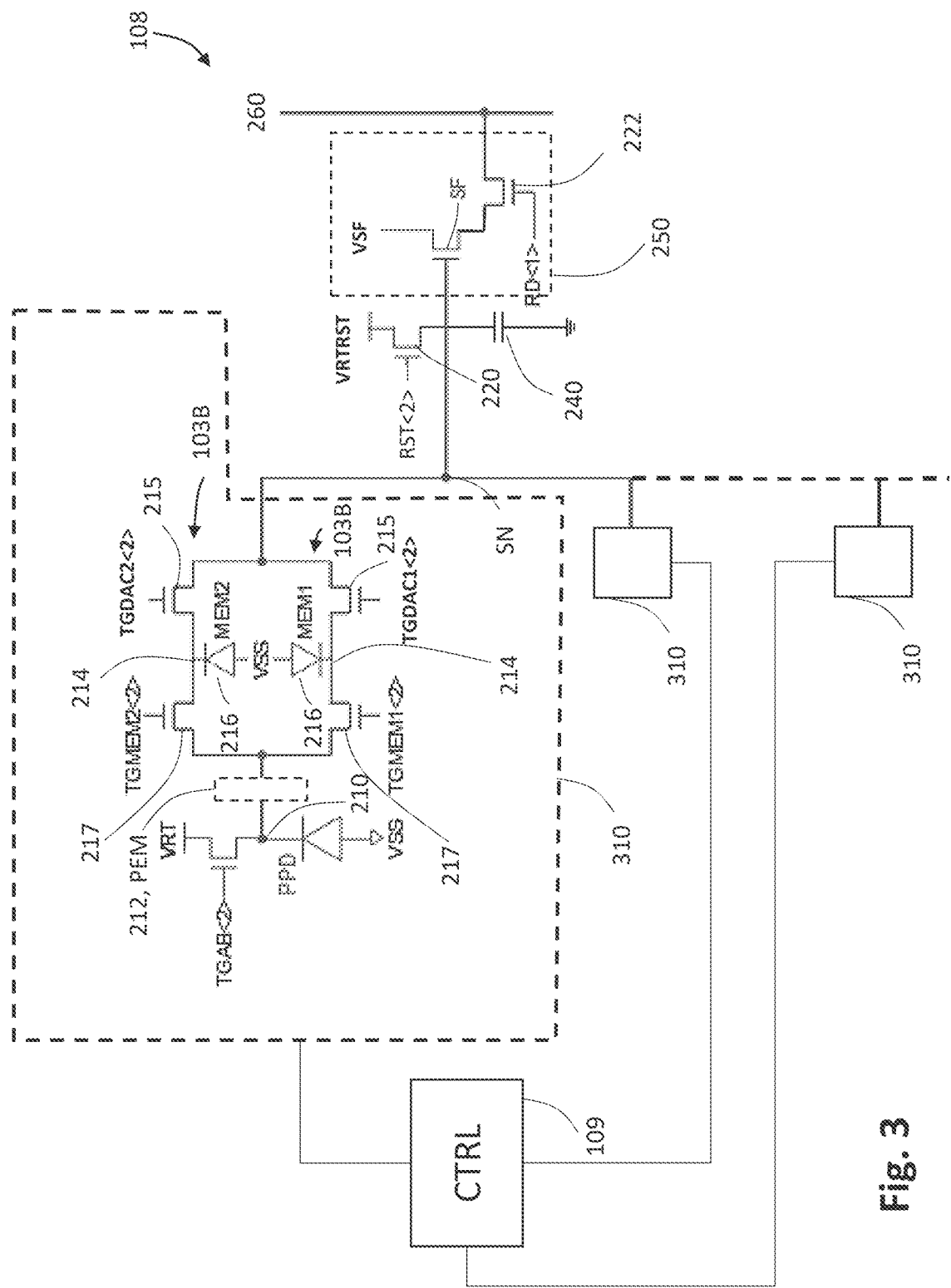
FIG. 3 schematically illustrates a DAC according to another embodiment of the present disclosure.

FIG. 3 schematically illustrates the DAC 108 of FIG. 1B in more detail according to another embodiment of the present disclosure. The example of the FIG. 3 illustrates an embodiment in which the pixels 103B of the DAC comprise the optional second transfer gate 217, the optional constant potential barrier 212, the optional photodiode PPD, and the optional third transfer gate 219.

The DAC 108 of FIG. 3 is similar to the DAC 108 of FIG. 2, except that the first and second pixels 103B form a first pair 310 of pixels that share a common constant potential barrier 212, photodiode PPD, and third transfer gate 219. The first and second pixels 103B are coupled together, for example, at a main conduction node common to their second transfer gate 217, in addition to being coupled together at the sensing node SN. The first transfer gate 215 of the second pixel 103B is, for example, controlled by a control signal TGDAC1<2> generated, for example, by the control circuit 109, and the second transfer gate 217 of the second pixel 103B is, for example, controlled by a control signal TGMEM1<2> also generated, for example, by the control circuit 109.

In the example of the FIG. 3, other pixels of the DAC 108 are arranged in further pairs 310, which are similar to the first pair.

Figure 4:
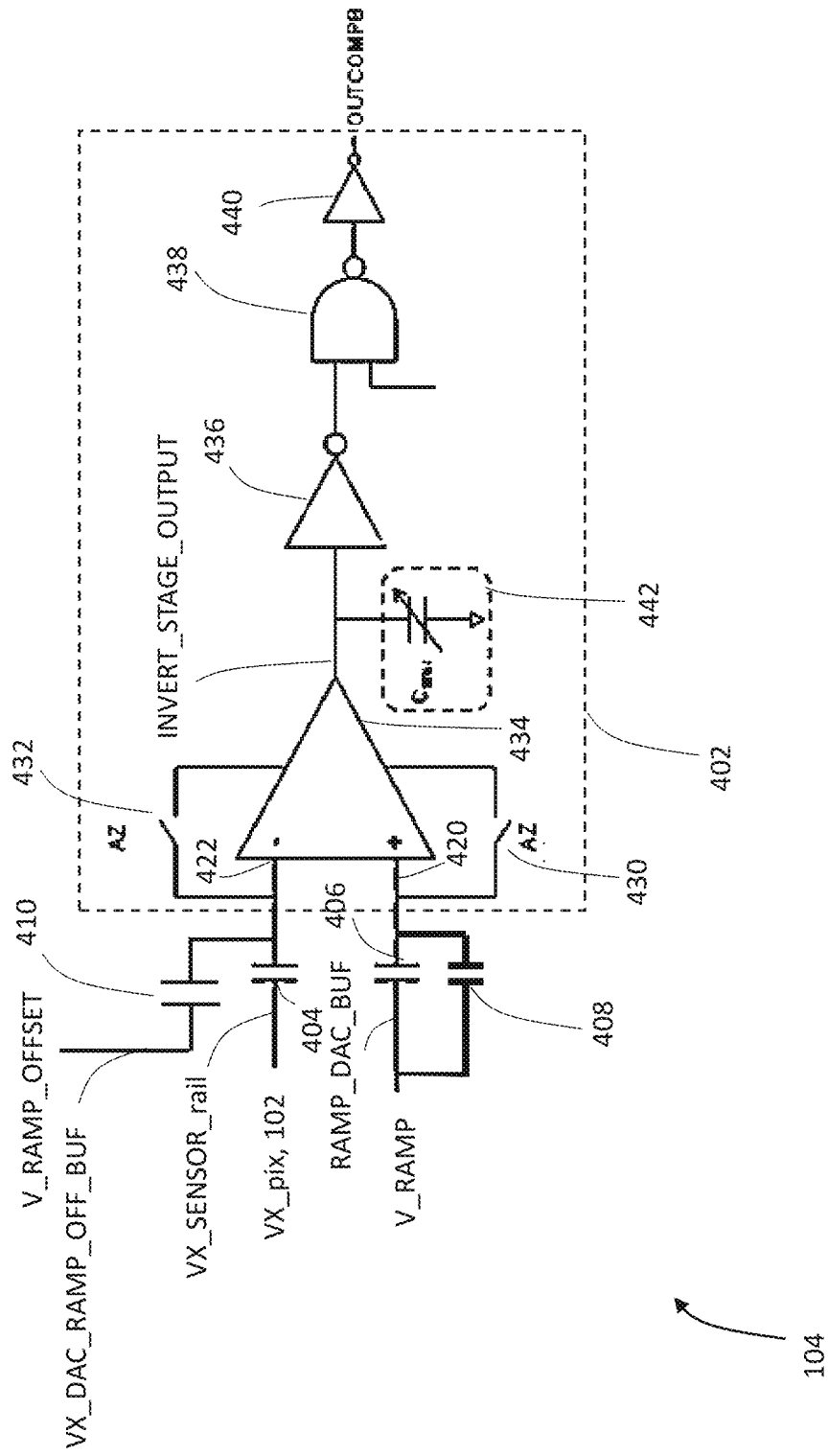
FIG. 4 schematically illustrates an analog to digital converter of the image sensor of FIG. 1B in more detail according to an embodiment of the present disclosure.

FIG. 4 schematically illustrates one of the analog to digital converters 104 of the image sensor 101B of FIG. 1B in more detail according to an embodiment of the present disclosure.

The example image sensor 400 of FIG. 4 comprises a comparator 402 having an comparator stage 434 with a first input 420 noted "+" and a second inverting input 422 noted "−". The first input 420 is, for example, capacitively coupled with a capacitor 406, and optionally with another additional capacitor 408 in order to maintain the load symmetry with the negative input, to the DAC buffer conduction rail RAMP_DAC_BUF of a first DAC DAC1. The first DAC, DAC1, is for example similar to the DAC 108 of FIG. 2 or 3. The second inverting input 422 is, for example, capacitively coupled, by a capacitor 404, to a pixel conduction rail VX_SENSOR_rail coupled to the pixel column conductor VX_pix, 102. The second inverting input 422 is, for example, also capacitively coupled to a DAC buffer conduction rail DAC_RAMP_OFF_BUF of a second DAC, DAC2. The second DAC, DAC2, is, for example, also similar to the DAC 108 of FIG. 2 or 3.

The first DAC, DAC1, is, for example, driven by the control circuit 109 to be a ramp generator configured to generate, on the DAC buffer conduction rail RAMP_DAC_BUF, a monotonically increasing (in the case that the charge carriers are holes rather than electrons) or monotonically decreasing voltage ramp RAMP1. The second DAC, DAC2, is, for example, driven by the control circuit 109 to be configured to generate a monotonically increasing (in the case that the charge carriers are holes rather than electrons) or monotonically decreasing offset voltage ramp RAMP2 on an offset ramp rail VX_DAC_RAMP_OFF_BUF. The offset voltage ramp RAMP2 is, for example, a monotonically increasing voltage ramp in the case that the voltage ramp on the DAC buffer conduction rail is monotonically increasing (again, in the case that the charge carriers are holes rather than electrons), or in another example a monotonically decreasing voltage ramp in the case that the voltage ramp on the DAC buffer conduction rail is monotonically decreasing.

In one or more embodiments, the comparator 402 is configured to provide, at an output OUTCOMPB of the comparator 402, a signal indicating when the ramp signal RAMP1 on the DAC buffer conduction rail RAMP_DAC_BUF of the first DAC, DAC1, crosses a signal on the pixel conduction rail VX_SENSOR_rail.

In an example, the capacitors 408, 406 and 404, 410 are configured such that they present an equal, or substantially equal, capacitance at the first input and at the second input of the comparator 402. In other words, the capacitors 406 and 408 are for example of substantially equal capacitance to each other, the capacitors 404, 410 are, for example, of substantially equal capacitance to each other, and the combined capacitance of the capacitors 406 and 408 is substantially equal to the combined capacitance of the capacitors 404 and 410.

In one or more embodiments, an output INVERT_STAGE_OUTPUT of the comparator stage 434 is coupled to the inverting input 422 via a switch 432 controlled by the reinitialization signal AZ. In one or more embodiments, the output INVERT_STAGE_OUTPUT of the comparator stage 434 is coupled to the first input 420 via a switch 430 also controlled by the reinitialization signal AZ.

The comparator stage 434 output INVERT_STAGE_OUTPUT is, for example, coupled to a buffer circuit comprising, in the example of FIG. 4, the series connection of a first invertor 436, a NAND gate 438 and of a second invertor 440. In some embodiments, the buffer circuit further comprises an adaptive capacitance 442, formed, for example, by a variable capacitor coupled between the output INVERT_STAGE_OUTPUT and ground. An output of the first inverter 436 is, for example, coupled to one input of the NAND gate 438, the second input of which, for example, receives a synchronization signal from a counter SRAM block. An output of the NAND gate 438 is, for example, coupled to an input the second inverter 440, which provides a buffered digital signal OUTCOMPB. The circuit formed by the elements 436, 438 and 440 is, for example, configured to adapt the output impedance of the comparator stage 434 to a level suitable for driving the counter or SRAM storage 106.

Figure 5:
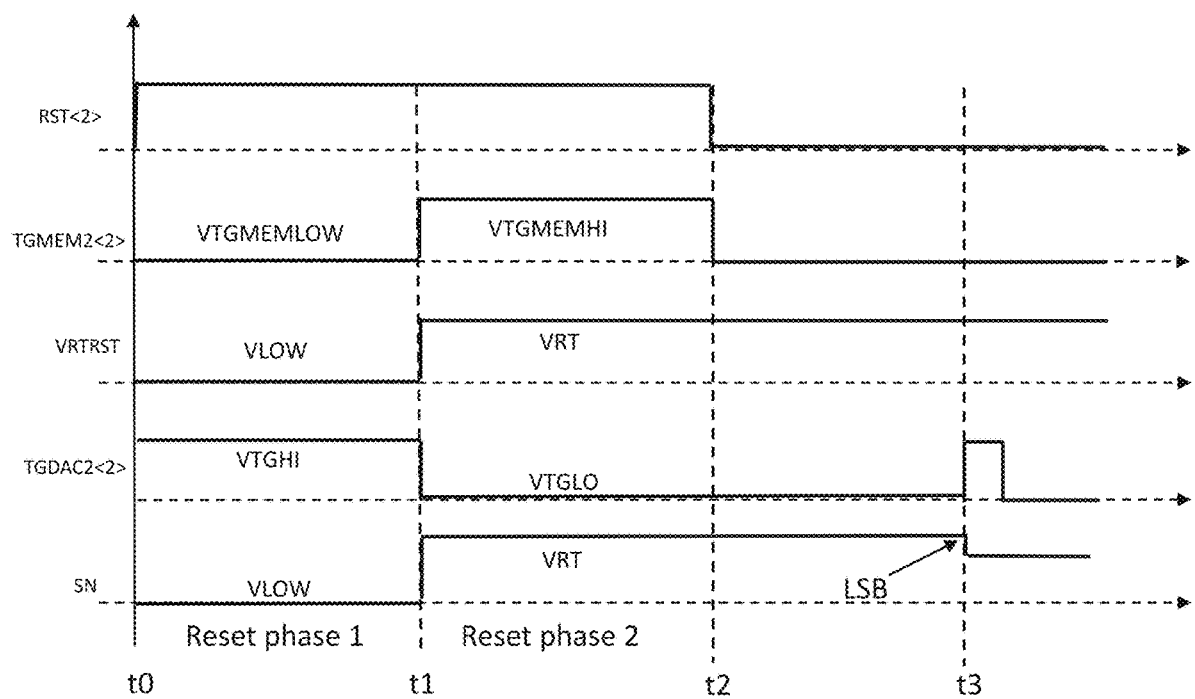
FIG. 5 is a timing diagram representing signals of the DAC of FIG. 2 or FIG. 3 during their operation.

FIG. 5 is a timing diagram representing signals of the DAC of FIG. 2 or FIG. 3 during their operation.

The following section describes the functioning, in one or more embodiments, of one of the pixels 103B of the DAC and in the case where the second transfer gate 217 is not present.

In one or more embodiments, between a time t0 and a time t1, also labelled Reset phase 1 in FIG. 5, the first voltage supply VRTRST is set at a value VLOW and the reset transistor 220 is controlled to be in a conducting state by the signal RST<2>, which is set to a high level. In one or more embodiments, in this Reset phase 1, the signal TGDAC2<2> controlling the first transfer gate 215 is set at a level VTGHI, at which the first transfer gate is conducting. In one or more embodiments, the voltage at the sensing node SN and at the memory node 214 is therefore set to VLOW.

In one or more embodiments, between the time t1 and a time t2, also labelled Reset phase 2 in FIG. 5, the first voltage supply VRTRST is set at a value VRT, which is, for example, higher than VLOW, and the reset transistor 220 is still in a conducting state. In one or more embodiments, in this Reset phase 2, the signal TGDAC2<2> controlling the first transfer gate 215 is set at a level VTGLO at which the first transfer gate is in a non-conducting state. In one or more embodiments, the voltage at the sensing node SN is therefore VRT, but charges are trapped at the memory node 214 and the voltage at the memory node 214 is kept at VLOW. In one or more embodiments, at the end of Reset phase 2, the reset transistor 220 is set to a non-conducting state, and the voltage at the sensing node remains at VRT, due to the capacitance 240 of the sensing node SN.

In one or more embodiments, during the Reset phases 1 and 2, the signals VRTRST and TGDAC2<2> are preferably not overlapping, in other words the signal TGDAC2<2>, for example, falls low prior to the rising edge of the signal VRTRST.

In one or more embodiments, at a time t3, a pulse of a voltage VTGHI is applied to the control signal TGDAC2<2> of the first transfer gate 215. In one or more embodiments, the first transfer gate 215 is therefore in a conducting state, which frees the charges stored at the memory node 214. In one or more embodiments, this leads to the transfer of the charges stored at the memory node 214 to the sensing node SN. In one or more embodiments, the voltage at the sensing node SN is therefore lowered, due to the negative nature of the charges in this example, by a value LSB (Least Significant Bit) corresponding to the amount of charges stored at the memory node 214 during the Reset phases 1 and 2.

In one or more embodiments, by reproducing sequentially these operations for each pixel 103B of the DAC 108, and because all pixels 103B of the DAC are connected to the sensing node SN, a voltage ramp is obtained at the sensing node SN.

In some examples, the operations described before time t3 are simultaneous for all of the pixels 103B of the DAC.

Furthermore, in some examples, the pulses controlling the first transfer gates 215 at the time t3 are, for example, spaced in time for each of the pixels 103B of the DAC. This, for example, results in a voltage ramp with a slope made of single LSB steps.

In another example, the pulses controlling the first transfer gates at the time t3 are simultaneous for given sets of the pixels 103B of the DAC. This, for example, results in a voltage ramp with a slope that is based on the given number of pixels in each set, resulting in the LSB steps.

The following section describes operation, in one or more embodiments, of one of the pixels 103B of the DAC in the case where the second transfer gate 217 is present in the pixels 103B of the DAC. The functioning diagram described in the previous paragraphs for the signals VRSTRST, TGDAC2<2> and the voltage at the sensing node SN still applies.

With reference to FIG. 5, in one or more embodiments, between the times t0 and t1, a voltage VTGMEMLOW is for example applied as the control signal TGMEM2<2> to the control node of the second transfer gate 217 in order to keep the second transfer gate in a non-conducting state, and to create a potential barrier TGMEMSUP (not illustrated in FIG. 5), which cannot for example be crossed by the charges held at the potential VLOW.

In one or more embodiments, between time t1 and time t2, a voltage VTGMEMHI is for example applied to the control node of the second transfer gate 217 in order to lower the potential barrier to a level TGMEMINF (not illustrated in FIG. 5) slightly greater than VLOW and contrary to VLOW, this value TGMEMINF is, for example, set by a manufacturing process. For example, the potential barrier is lowered to a level comprised between VLOW and VLOW+10% VLOW, or adjusted to be equal to VLOW. In one or more embodiments, a certain amount of the charges stored at the memory node 214 are therefore transferred through the second transfer gates 217, until the voltage level at the memory nodes 214 is equal to the level of the potential barrier. This operation, for example, allows the quantity of the charges stored at the memory nodes 214 of the pixels 103B of the DAC to be controlled in a precise manner, avoiding the impact of possible variations of the voltage on the voltage supply rail VRTRST.

After the time t2, the voltage VTGMEMLOW is, for example, applied to the control node of the second transfer gate 217 in order to form again the potential barrier TGMEMSUP.

FIGS. 6 to 10 are charge flow diagrams representing the flow of charges in the pixels 103B of the DAC. In these figures, the electric potentials increase from the top of the figure to the bottom, as indicated by the arrows in these figures.

Figure 6:
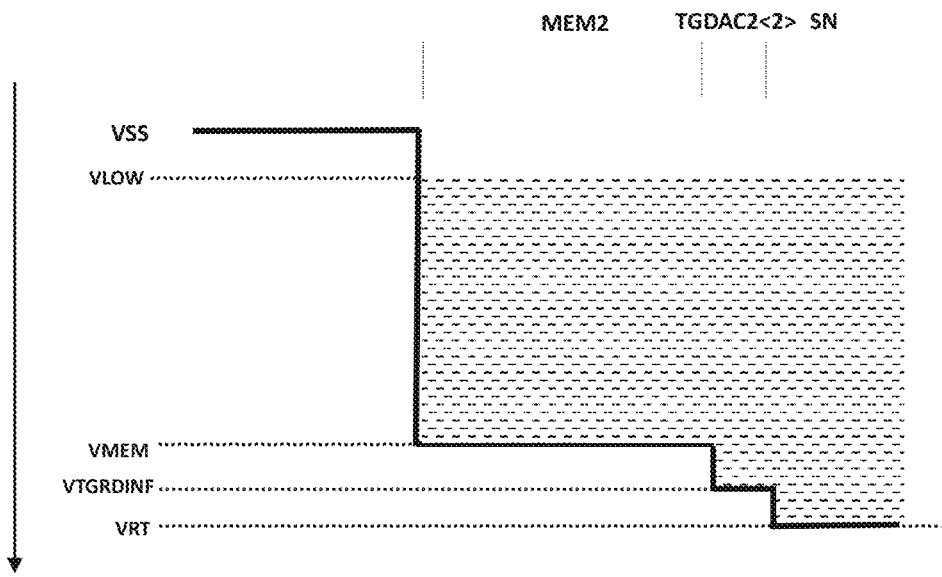
FIG. 6 is a charge flow diagram illustrating a step of an operation of storing charge in a pixel of a DAC according to an embodiment of the present disclosure.
Figure 7:
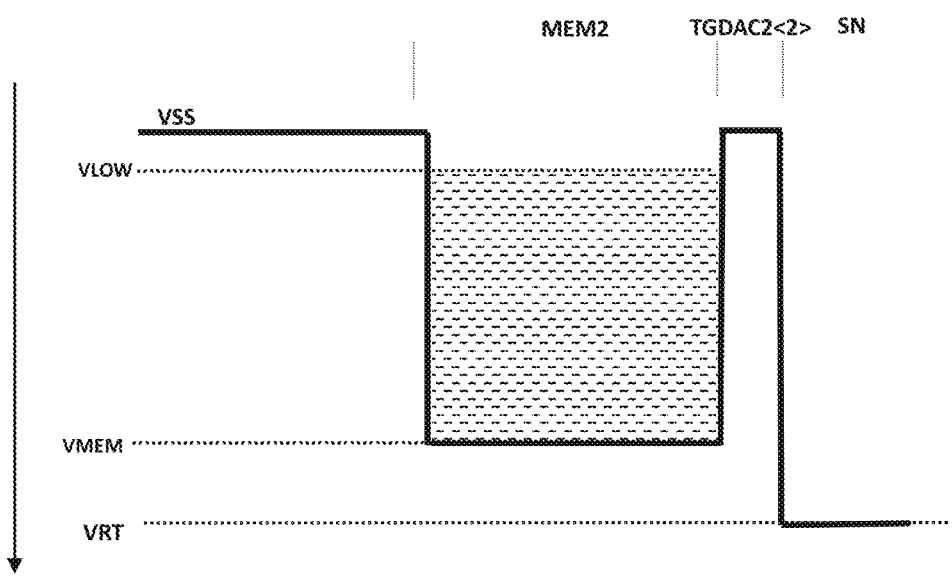
FIG. 7 is a charge flow diagram illustrating a further step of the operation of FIG. 6 of storing charge in the pixel of the DAC.
Figure 8:
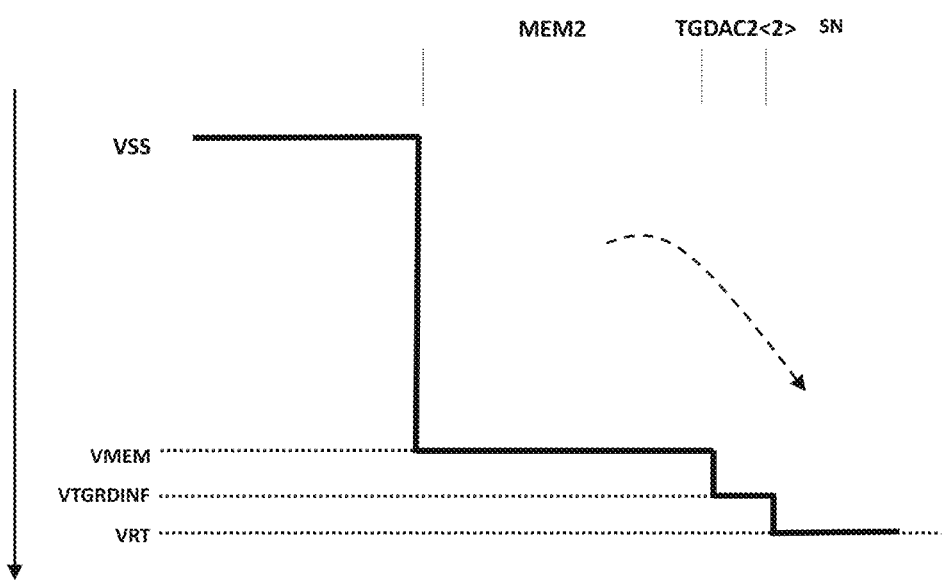
FIG. 8 is a charge flow diagram illustrating a further step of the operation of FIGS. 6 and 7 of using charge in the pixel of the DAC.

FIGS. 6 to 8 correspond to a first example in which the pixels 103B for example each correspond to the example of FIG. 2, except that the second and third transfer gates 217, 219, as well as the photodiode PPD and the potential barrier 212, are not present in the pixels 103B. In this example, the amount of charge stored at the memory node 214 (MEM2) is determined by a voltage level VLOW applied to the sensing node SN.

The example of FIG. 6 corresponds to the period between the times t0 and t1 of FIG. 5 in the case where the second transfer gate 217 is not present. In one or more embodiments, during the Reset phase 1, the sensing node SN is set at the voltage level VLOW and the first transfer gate 215 is in a conducting state, which means that its potential barrier level is set at a level VTGRDINF greater than VLOW, for example slightly lower than the voltage level VRT.

FIG. 7 is a charge flow diagram illustrating a further step of the operation of FIG. 6 of storing charge in the pixel of the DAC. The example of FIG. 7 corresponds to the period between time t1 and time t2 of FIG. 5. In one or more embodiments, during this period, the voltage signal TGDAC2<2> is brought to a level, for example VSS, which is lower than the voltage VLOW, and results in a potential barrier that traps the charge at the memory node MEM2 between the potential barrier formed at the first transfer gate 215 and the potential barrier created by the voltage VSS. In one or more embodiments, the quantity of stored charge depends on the difference between the voltage VLOW and an upper electron potential level VMEM of the memory node MEM2. The level VMEM is, for example, set by doping of the memory node MEM2. The level VMEM is, for example, lower than the voltage VRT, but greater than the voltage VLOW.

FIG. 8 is a charge flow diagram illustrating a further step of the operation of FIGS. 6 and 7 of using charge in the pixel of the DAC. The example of FIG. 8 corresponds to the period after time t3 of FIG. 5.

In one or more embodiments, after time t3, the potential barrier formed by the signal TGDAC2<2> is brought back to the level VTGRDINF, which allows the charges previously trapped to be transferred, as represented by a dashed arrow, towards the sensing node SN, which is capacitively initialized at the voltage VRT.

Figure 9:
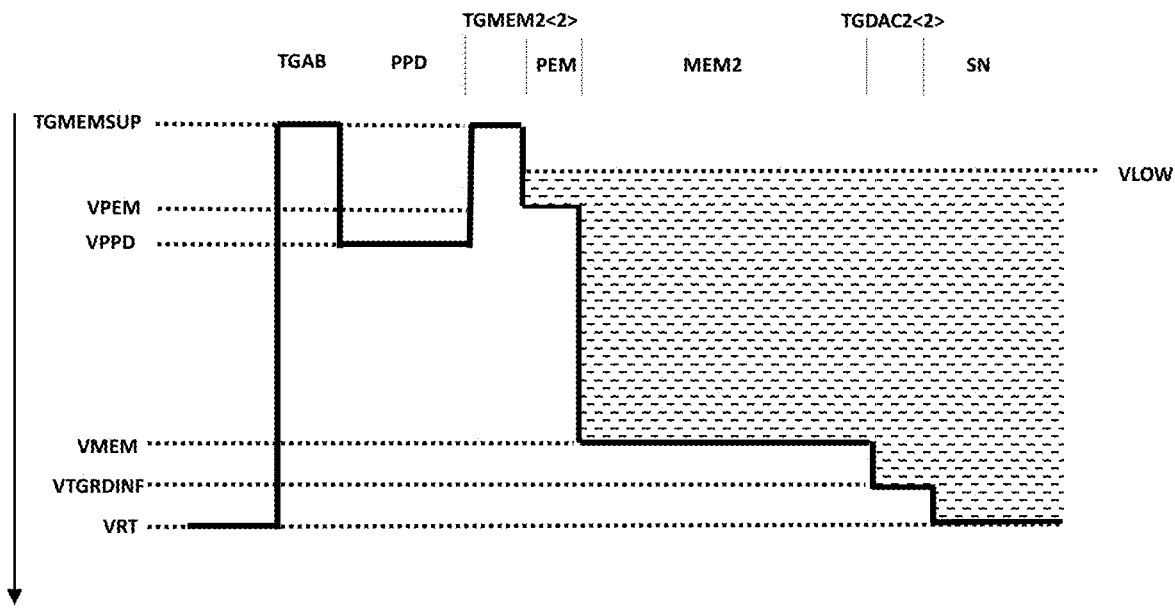
FIG. 9 is a charge flow diagram illustrating a step in an operation of using charge in a pixel of a DAC according to another embodiment of the present disclosure.
Figure 10:
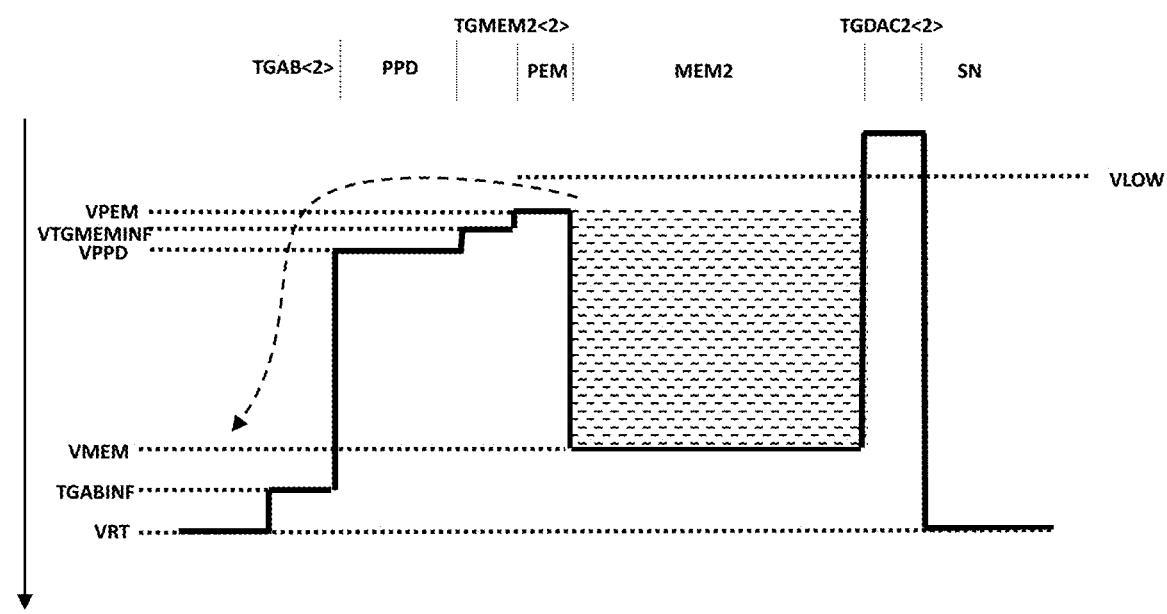
FIG. 10 is a charge flow diagram illustrating a further step of the operation of FIG. 9 of storing charge in the pixel of the DAC.

FIGS. 9 and 10 are charge flow diagrams illustrating steps in an operation of using charge in a pixel of a DAC according to another embodiment of the present disclosure. FIGS. 9 and 10 correspond to a second example based on the pixel 103B of FIG. 2, in which there are the second and the third transfer gates 217, 219, as well as the potential barrier 212 and the photodiode PPD. In this example, the amount of charge stored at the memory node MEM2 is determined by the potential barrier PEM 212.

The example of FIG. 9 corresponds to the period between time t0 and time t1 of FIG. 5 in the case where the second transfer gate 217 is present. In the example of FIG. 9, the pixel 103B comprises the third transfer gate TGAB<2>, the photodiode PPD and the potential barrier PEM. In the example of FIG. 9, the constant potential barrier PEM is for example configured to be at a level situated between VMEM and VLOW. In one or more embodiments, during the Reset phase 1, the sensing node SN is set to the voltage level VLOW and the first transfer gate 215 is set at the voltage level VTGRDINF, which is, for example, greater than the voltage levels VLOW and VMEM, and for example slightly lower than the voltage level VRT. During the Reset phase 1, the second transfer gate TGMEM<2> is set at TGMEMSUP, which blocks the charge injected by the first supply rail VRTRST at VLOW. In one or more embodiments, the photodiode potential level is noted VPPD and is, for example, greater than the voltage level TGMEMSUP. In one or more embodiments, the third transfer gate 219 is controlled by the signal TGAB<2> to be at a potential that is, for example, lower than the voltage level VPPD.

FIG. 10 is a charge flow diagram illustrating a further step of the operation of FIG. 9 of storing charge in the pixel of the DAC. The example of FIG. 10 corresponds to the Reset phase 2 of FIG. 5. In one or more embodiments, during this phase, the first transfer gate signal TGDAC2<2> is controlled, for example, to be at the potential VSS, which is lower than the voltage VLOW. In one or more embodiments, during this phase, the control signal TGMEM<2> of the second transfer gate 217 is controlled to be at the potential VTGMEMINF, and the control signal TGAB<2> of the third transfer gate 219 is controlled to be at a potential TGABINF, which is greater than the voltages VPPD, VTGMEMINF and VPEM and lower than the voltage VRT. In one or more embodiments, charges at the memory node MEM2 overflow over the constant potential barrier PEM, as well as through the second transfer gate 217 and the third transfer gate 219, towards the third voltage supply, which is at the potential VRT. Thus, in one or more embodiments, the quantity of charges remaining at the memory node MEM2 corresponds to a voltage level equal to that of the potential barrier voltage VPEM. In one or more embodiments, because VPEM can be set precisely during the manufacturing process, the amount of charges stored to create an LSB is therefore precisely controlled. The steps described in relation with FIGS. 9 and 10 can be used, for example, to further release the stored charges and transfer them to the sensing node SN to create an LSB.

Figure 11:
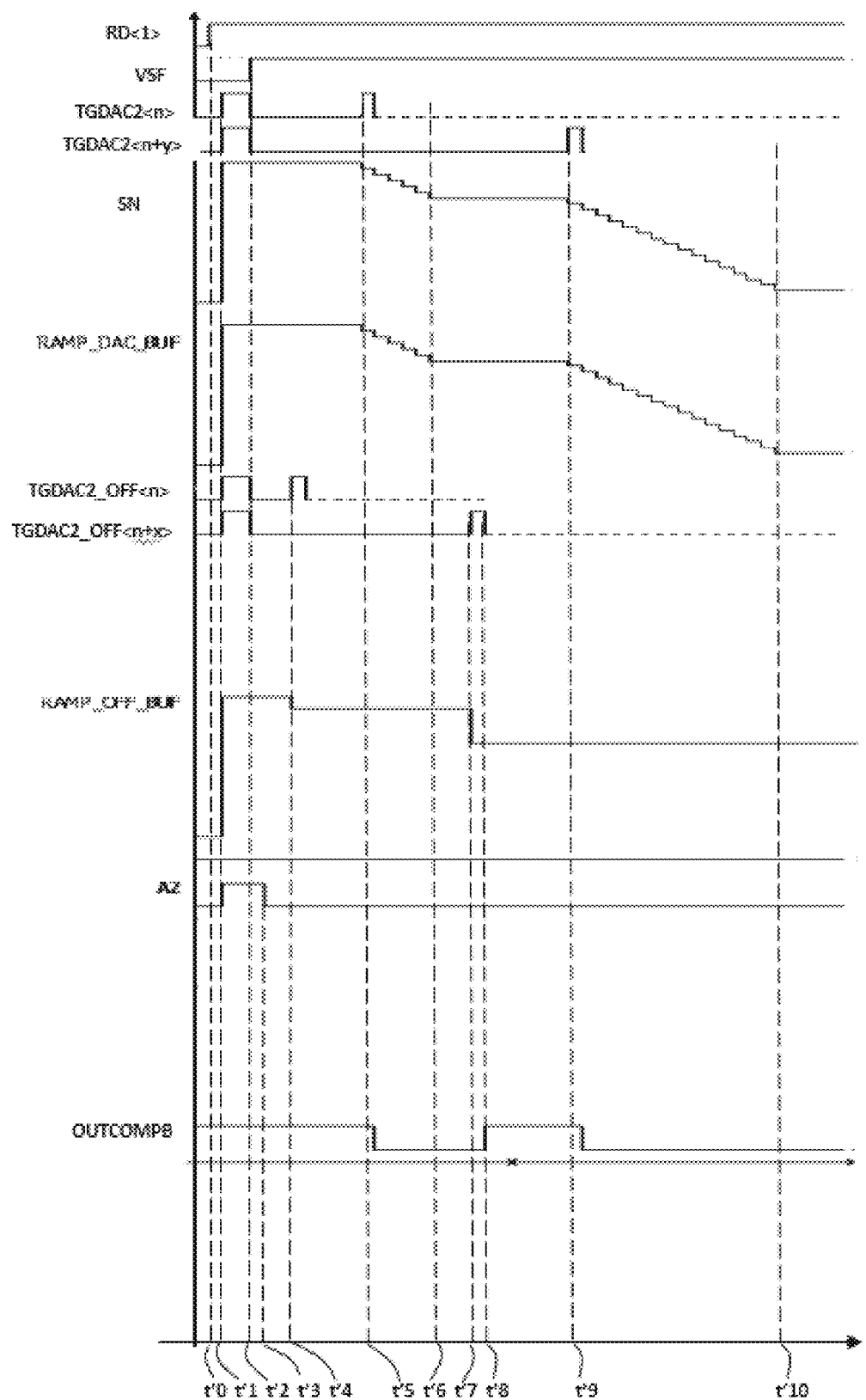
FIG. 11 is a timing diagram representing signals for generation of a voltage ramp using the DAC of FIG. 2 or FIG. 3 according to an embodiment of the present disclosure.

FIG. 11 is a timing diagram representing signals for generation of a voltage ramp using the DAC of FIG. 2 or FIG. 3 according to an embodiment of the present disclosure. The timing diagram of FIG. 11 also represents the generation of the offset voltage ramp RAMP2 of FIG. 4 with the second DAC, DAC2. The timing diagram of FIG. 11 also represents the first stage output of the comparator 402 of FIG. 4, as well as the output signal OUTCOMPB of the comparator 402.

FIG. 11 illustrates, in particular, examples of: the signal RD<1> controlling the transistor 222 of the first DAC, DAC1; the voltage VSF; control signals TGDAC2<n> to TGDAC2<n+y> controlling y corresponding first transfer gates 215 of the first DAC, DAC1; the voltage at the sensing node SN of the first DAC, DAC1; the output voltage signal RAMP_DAC_BUF of the first DAC, DAC1; control signals TGDAC2_OFF<n> to TGDAC2_OFF<n+x> controlling x corresponding first transfer gates 215 of the second DAC, DAC2; the output voltage signal RAMP_OFF_BUFF of the second DAC, DAC2; the reinitialization signal AZ, and the comparator output signal OUTCOMPB. The signal RD<1> is a control signal for enabling the DAC. All of the sensing nodes SN, as well as the VX lines and RAMP_DAC_BUF lines are for example shorted together.

In one or more embodiments, at a time t'0, the transistor 222 of the first DAC, DAC1, is controlled by the control signal RD<1> to be in a conducting state, and to remain in the conducting state for all the ramp generation steps.

In one or more embodiments, at time t'1, the sensing node SN is set at the voltage VRT level by applying a reinitialization signal AZ with a voltage pulse to the switches 430, 432 of the comparator 402. In one or more embodiments, this pulse lasts until a time t'3. In one or more embodiments, it sets the sensing node SN of the first DAC, DAC1, as well as the DAC buffer conduction rail RAMP_DAC_BUF, to the voltage level VRT.

In one or more embodiments, at time t'1, the signals controlling the first transfer gates 215, controlled by signals labelled TGDAC2<n> and TGDAC2<n+y>, of y pixels of the first DAC, DAC1, are each controlled by a corresponding pulse signal, which lasts until a time t'2, which is earlier than a time t'3. In one or more embodiments, the pulse signal causes the first transfer gates 215 to be in a conductive state during the pulse. In one or more embodiments, the number y of pixels is an integer representing a number of additional pixels 103B of the first DAC, DAC1, involved in the first ramp RAMP1 generation. In one or more embodiments, the value n is an integer that represents a rank of the pixel 103B in the pixel array.

In one or more embodiments, at a time t'5, a first pulse, similar to the pulse happening at time t3 in FIG. 5, of the signal TGDAC2<n> sets the first transfer gate 215 in a conductive state. In one or more embodiments, this results in a decrease, by an LSB value, of the VRT voltage at the sensing node SN of the first DAC, DAC1. In the example of FIG. 11, between the time t'5 and a time t'6, corresponding pulses are applied to the control signals TGDAC2<n> to TGDAC2<n+(y−1)> of each of y of first transfer gates 215 of the y pixel 103B. In the example of FIG. 11, only the first pulse applied on the first transfer gate TGDAC2<n> (y=0), is represented. In one or more embodiments, the signals SN and RAMP_DAC_BUFF illustrate a first falling ramp resulting from these pulses applied on the respective first transfer gates. In one or more embodiments, each pulse leads to a decrease of an LSB value of the VRT voltage at the sensing node of the first DAC, DAC1, and further of the DAC buffer conduction rail RAMP_DAC_BUF. In the example of FIG. 11, the first falling ramp comprises six steps, and thus, at time t'6, the voltage variation is VRT-6*LSB. In alternative embodiments, y could have a different value such that this ramp has a different number of steps, and finishes at a voltage VRT-y*LSB.

The example of FIG. 11 also comprises a second falling voltage ramp, which occurs between a time t'9 and a time t'10. For example, the first falling voltage ramp is used to perform digital conversion of pixel reference voltages read from imaging pixels 103A, and the second falling ramp is used to perform digital conversion of pixel signal voltages read from imaging pixels 103A according to a CDS (correlated double sampling) technique.

In one or more embodiments, between the times t'9 and t'10, this second falling voltage ramp is created, starting from the voltage VRT-6*LSB, which was kept constant between the times t'6 and t'9. In one or more embodiments, the second falling ramp is obtained by operation steps that are similar to the steps between the times t'5 and t'6, except that a certain number of additional pixels are involved, equal to 16 in the example of FIG. 11, and the final voltage of the additional ramp is for example VRT-6*LSB-16*LSB. In alternative embodiments, this second falling ramp has a different number z of steps, where z is a positive integer equal to two or more, and the second falling ramp starts at the voltage VRT-y*LSB and ends at the voltage VRT-y*LSB-z*LSB.

The following section describes the generation of the offset voltage ramp RAMP2 of FIG. 4, which is generated, in one or more embodiments, using the second DAC, DAC2.

In one or more embodiments, at the time t'0, the transistor 222 of the second DAC, DAC2, is controlled, also by the signal RD<1>, to be in a conducting state and to remain in the conducting state for all the ramp generation steps.

In one or more embodiments, at the time t'1, the first transfer gate 215 of a pixel of the second DAC, DAC2, controlled by a signal TGDAC2_OFF<n> and further first transfer gates 215 of additional pixels of the second DAC, DAC2, controlled by corresponding signals TGDAC2_OFF<n+1> to TGDAC2_OFF<n+x>, are controlled by a corresponding pulse signal, which lasts until the time t'2. In one or more embodiments, the value x is an integer representing a number of additional pixels 103B of the second DAC, DAC2. In one or more embodiments, these pulses cause the corresponding first transfer gates 215 of the second DAC, DAC2, to be in a conductive state.

In one or more embodiments, at the time t'4, another pulse of the signal TGDAC2_OFF<n>, similar to the pulse occurring at the time t3 in FIG. 5, sets the first transfer gate 215 of the second DAC, DAC2, to the conductive state. In one or more embodiments, this results in a decrease of an LSB value of the VRT voltage, which is capacitively held at the sensing node SN of the second DAC, DAC2. In one or more embodiments, the offset voltage ramp RAMP_OFF_BUF of the second DAC, DAC2, is then at a voltage VRT-LSB.

In another example, the first transfer gate 215 of w additional pixels 103B of the second DAC, DAC2, where w is an integer, is controlled to be in the conductive state at the time t'4 to obtain a decrease of several LSBs of the voltage capacitively held at the sensing node SN of the second DAC, DAC2. In one or more embodiments, the voltage variation at the time t'4 would then be VRT-w*LSB according to the chosen ADC offset.

In one or more embodiments, at the time t'7, another pulse, similar to the pulse occurring at the time t3 in FIG. 5, sets the first transfer gate 215 of x additional pixels of the second DAC, DAC2 in a conductive state at the same time. In one or more embodiments, this results in a voltage drop of x times an LSB value of the VRT voltage that is capacitively held at the sensing node SN of the second DAC, DAC2. In one or more embodiments, at the time t'7, the voltage variation at the sensing node SN, and of the offset voltage ramp RAMP_OFF_BUF of the second DAC, DAC2, is then VRT-w*LSB-x*LSB.

The following section describes a timing example of the signal OUTCOMPB of the comparator 402.

In the example of FIG. 4, the offset voltage ramp RAMP_OFF_BUF is applied to the inverting input 422 of the comparator stage 434 of the comparator 402. In one or more embodiments, the signal RAMP_OFF_BUF, which is combined with the signal VX_pix coming from the pixels 103A of, for example, a same column as the second DAC, DAC2, is therefore subtracted from the signal RAMP_DAC_BUF coming from the first DAC, DAC1.

In the example of FIG. 11, the output signal OUTCOMPB of the comparator 402 is at a high level from the time t'0 to the time t'5. In one or more embodiments, at the time t'5, the pixel signal VX_pix (not illustrated), coming from the imaging pixels 103A and combined with the offset ramp voltage RAMP_OFF_BUF, crosses the ramp formed between the time t'5 and the time t'7. This results in a reduced voltage level of the signal OUTCOMPB until a time t'8, when the output signal OUTCOMPB of the comparator 402 rises again to a high level from the time t'8 to approximately the time t'9. In one or more embodiments, after the time t'9, the pixel signal VX_pix, combined with the offset ramp voltage RAMP_OFF_BUF, crosses the ramp formed between the time t'9 and the time t'10. In one or more embodiments, this results in a reduced voltage level of the signal OUTCOMPB. The example of FIG. 11 allows a correlated double sampling technique to be performed in order to remove thermal noise. For example, the time period between the falling edges of the comparator output signal OUTCOMB is converted by a time to digital converter, such as a counter, in order to generate a digital output signal.

Figure 12:
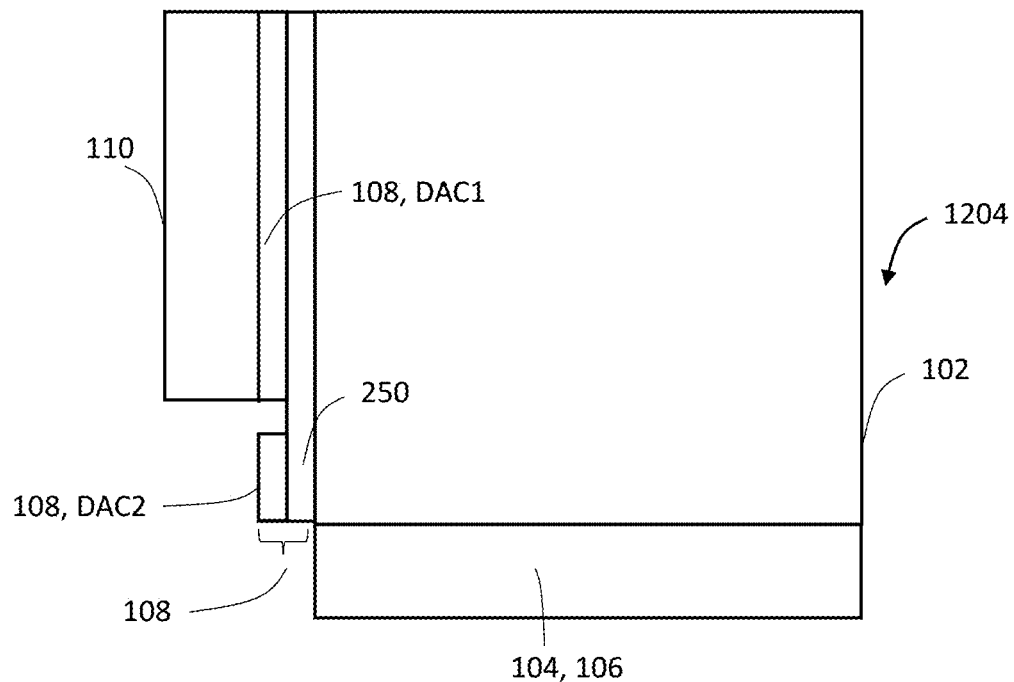
FIG. 12 illustrates an image sensor according to an embodiment of the present disclosure.

FIG. 12 schematically illustrates an image sensor 1204 according to one embodiment of the present disclosure. In the example of FIG. 12, the pixels 103B of the first DAC 108, DAC1, are arranged in a column between the row decoders 110 and the pixel array 102. In one or more embodiments, the impedance buffer 250 of the example of FIG. 12 is arranged in a column between the pixels 103B of the first DAC1 and the pixel array 102. In the example of FIG. 12, the pixels 103B of the second DAC 108, DAC2, are arranged, for example, in a same column as the pixels 103B of the first DAC, DAC1, but in a separate area. In one or more embodiments, the impedance buffer 250 of the second DAC, DAC2, is arranged in a column between the pixels 103B of the second DAC, DAC2, and the pixel array 102.

In the example of FIG. 12, the pixels 103B of the first DAC, DAC1 are coupled in a column by the same sensing node SN and with the same impedance buffer output rail 260. In the example of FIG. 12, the pixels 103B of the second DAC, DAC2, are coupled in a column by the same sensing node, different from the one of the first DAC, DAC1, and by an impedance buffer output rail 260, different from the impedance buffer of the first DAC, DAC1.

Figure 13:
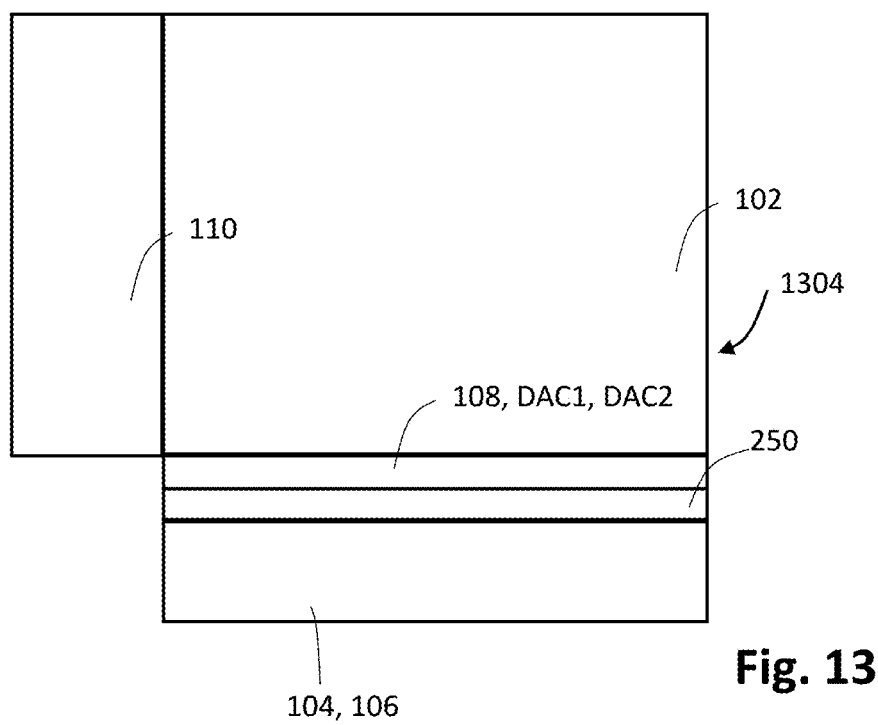
FIG. 13 illustrates an image sensor according to another embodiment of the present disclosure.

FIG. 13 schematically illustrates an image sensor 1304 according to another embodiment of the present disclosure.

In the example of FIG. 13, the pixels 103B of the first DAC 108, DAC1, are arranged in rows between the array 102 of pixels 103A and the analog voltage ramp generator of the ADCs 104. In one or more embodiments, the impedance buffer 250 in the example of FIG. 13 is arranged in a row between the pixels 103B of the first or second DAC 108, DAC1, DAC2, and the pixel array 102. In an example, the pixels 103B of the first and second DAC, are arranged, for example, in separate rows.

Figure 14:
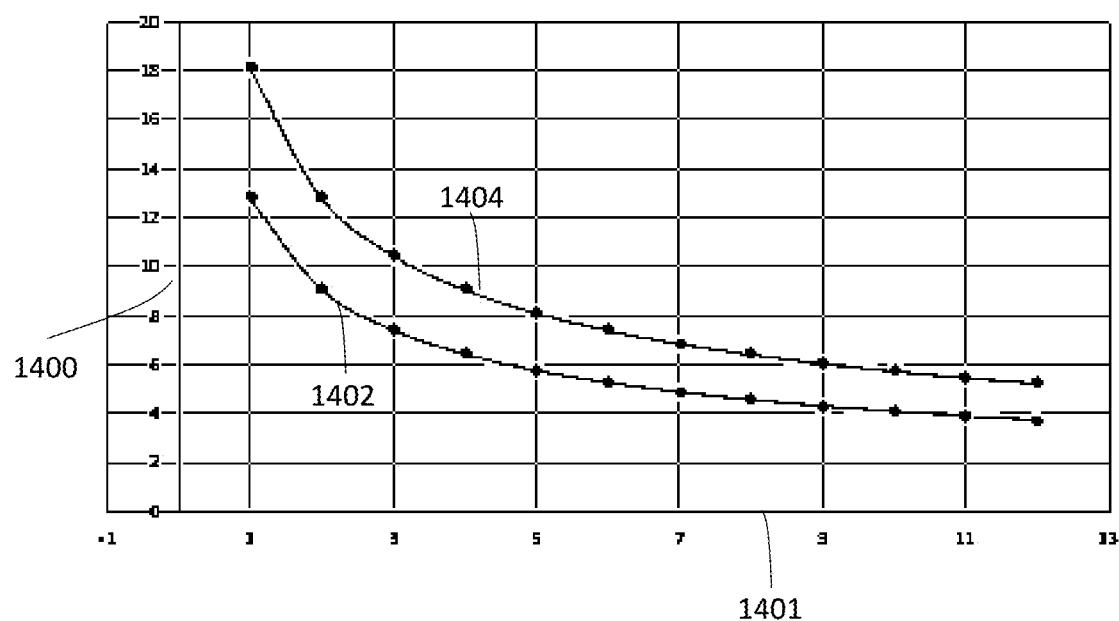
FIG. 14 is a graph illustrating thermal noise as function of a number of pixels in parallel comprised in the DAC of FIG. 2 or FIG. 3.

FIG. 14 is a graph illustrating thermal noise, labelled 1400, as function of the number of pixels in parallel, labelled 1401, comprised in the DAC of FIG. 2 or FIG. 3. In the example of FIG. 14, a curve 1404 represents the thermal noise as measured in black conditions (µV rms units) as a function of the number of pixels in parallel coupled to the same sense node in a 10-bit DAC, and a curve 1402 represents the thermal noise as a function of the number of pixels in parallel coupled to the same sense node in a 11-bit DAC. FIG. 14 demonstrates that, in one or more embodiments, with a greater number of DAC bits, the thermal noise is lower.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A digital to analog converter (DAC), comprising:
at least a first pixel comprising a first transfer gate coupling a first memory node of the first pixel and a capacitive sensing node (SN);
at least a second pixel comprising a second transfer gate coupling a second memory node of the second pixel and the capacitive SN;
a reset transistor coupling the capacitive SN to a first voltage supply rail; and
a control circuit configured to:
store electrical charge at each of the first memory node and the second memory node by activating the reset transistor to apply a reference voltage to the first memory node of the first pixel and the second memory node of the second pixel; and generate an output voltage of the DAC at the capacitive SN by deactivating the reset transistor and controlling, based on a digital input signal, the first transfer gate of the first pixel and the second transfer gate of the second pixel to transfer the electrical charge stored at the first memory node and the second memory node to the capacitive SN.

2. The DAC of claim 1, wherein, after applying the reference voltage to the first memory node and the second memory node and prior to deactivating the reset transistor, the control circuit is further configured to control the reset transistor and the first voltage supply rail to apply an initial voltage to the capacitive SN while the first memory node of the first pixel and the second memory node of the second pixel are insulated from the capacitive SN by the first transfer gate and the second transfer gate.

3. The DAC of claim 1, wherein:
the first pixel further comprises a third transfer gate coupling the first memory node of the first pixel to a first input node of the first pixel, and
the second pixel further comprises a fourth transfer gate coupling the second memory node of the second pixel to a second input node of the second pixel, and
wherein storing the electrical charge at the first memory node and the second memory node further comprises, prior to activating the reset transistor:
controlling, by the control circuit, the third transfer gate of the first pixel to prevent transfer of the electrical charge between the first memory node of the first pixel and the first input node of the first pixel; and
controlling, by the control circuit, the fourth transfer gate of the second pixel to prevent transfer of the electrical charge between the second memory node of the second pixel and the second input node of the second pixel.

4. The DAC of claim 3, wherein:
the first pixel further comprises a first constant potential barrier separating the first memory node of the first pixel from the third transfer gate of the first pixel; and
the second pixel comprises a second constant potential barrier separating the second memory node of the second pixel from the fourth transfer gate of the second pixel,
wherein storing the electrical charge at the first memory node and the second memory node further comprises, prior to controlling the first transfer gate of the first pixel and the second transfer gate of the second pixel to transfer the electrical charge stored at the first memory node and the second memory node to the capacitive SN:
controlling, by the control circuit, the third transfer gate of the first pixel to obtain a transfer of a first partial amount of the electrical charge stored at the first memory node of the first pixel, over the first constant potential barrier, to the first input node of the first pixel; and
controlling, by the control circuit, the fourth transfer gate of the second pixel to obtain a transfer of a second partial amount of the electrical charge stored at the second memory node of the second pixel, over the second constant potential barrier, to the second input node of the second pixel.

5. The DAC of claim 4, wherein:
the first pixel further comprises a fifth transfer gate coupling a second voltage supply rail to the first input node of the first pixel; and
the second pixel further comprises a sixth transfer gate coupling the second voltage supply rail to the second input node of the second pixel,
wherein storing the electrical charge at the first memory node and the second memory node further comprises, prior to controlling the first transfer gate of the first pixel and the second transfer gate of the second pixel to transfer the electrical charge stored at the first memory node and the second memory node to the capacitive SN:
controlling, by the control circuit, the fifth transfer gate and the second voltage supply rail of the first pixel to transfer the first partial amount of the electrical charge from the first input node of the first pixel to the second voltage supply rail, and
controlling, by the control circuit, the sixth transfer gate and the second voltage supply rail of the second pixel to transfer the second partial amount of the electrical charge from the second input node of the second pixel to the second voltage supply rail.

6. The DAC of claim 1, wherein:
the first pixel comprises a first diode,
the second pixel comprises a second diode,
a first anode of the first diode and a second anode of the second diode are coupled to a ground potential,
a first cathode of the first diode of the first pixel is coupled to the first memory node of the first pixel, and
a second cathode of the second diode of the second pixel is coupled to the second memory node of the second pixel.

7. The DAC of claim 1, wherein:
the first pixel comprises a first photodiode,
the second pixel comprises a second photodiode,
a first anode of the first photodiode and a second anode of the second photodiode are coupled to a further voltage supply rail,
a first cathode of the first photodiode of the first pixel is coupled to a first input node of the first pixel, and
a second cathode of the second photodiode of the second pixel is coupled to a second input node of the second pixel.

8. The DAC of claim 1, wherein:
the DAC is included in a ramp generator, and
the control circuit is further configured to generate a voltage ramp at the capacitive SN by activating sequentially the first transfer gate of the first pixel and the second transfer gate of the second pixel to transfer the electrical charge stored at the first memory node of the first pixel to the capacitive SN prior to transferring the electrical charge stored at the second memory node of the second pixel to the capacitive SN.

9. The DAC of claim 8, further comprising N pixels including the first pixel and the second pixels, wherein:
N is an integer equal to at least 3,
each of the N pixels comprises a respective transfer gate coupling a respective memory node and the capacitive SN, and
the control circuit is configured to generate the voltage ramp at the capacitive SN by controlling the respective transfer gates of the N pixels to sequentially transfer the electrical charge stored at the respective memory nodes of each of the N pixels to the capacitive SN.

10. The DAC of claim 8, further comprising N pixels including the first pixel and the second pixel, wherein:
N is an integer equal to at least 3,
each of the N pixels comprises a respective transfer gate coupling a respective memory node and the capacitive SN, and
the control circuit is further configured to generate the voltage ramp at the capacitive SN by activating sequentially the respective transfer gates of sets of the N pixels to transfer the electrical charge stored at a respective memory node of one of the sets of the N pixels to the capacitive SN prior to transferring the electrical charge stored at another respective memory node of another of the sets of the N pixels to the capacitive SN.

11. The DAC of claim 9, further comprising an impedance buffer coupled between the capacitive SN and a DAC buffer conduction rail, wherein the DAC buffer conduction rail is coupled to all pixels of the DAC.

12. The DAC of claim 11, wherein:
the impedance buffer comprises a first transistor and a second transistor coupled in series with each other and coupling a third voltage supply rail to the DAC buffer conduction rail,
a control node of the first transistor is coupled to the capacitive SN, and
a main conduction node of the second transistor is coupled to the DAC buffer conduction rail.

13. A method of digital to analog conversion by a digital to analog converter (DAC), the method comprising:
storing electrical charge, by a control circuit of the DAC, at a first memory node of a first pixel and at a second memory node of a second pixel by activating a reset transistor to apply a reference voltage to the first memory node of the first pixel and the second memory node of the second pixel, wherein:
the first pixel comprises a first transfer gate coupling the first memory node of the first pixel and a capacitive sensing node (SN),
the second pixel comprises a second transfer gate coupling the second memory node of the second pixel and the capacitive SN, and
the reset transistor couples the capacitive SN to a first voltage supply rail; and
generating, by the control circuit, an output voltage of the DAC at the capacitive SN by deactivating the reset transistor and controlling, based on a digital input signal, the first transfer gate of the first pixel and the second transfer gate of the second pixel to transfer the electrical charge stored at the first memory node and the second memory node to the capacitive SN.

14. The method of claim 13, further comprising, after applying the reference voltage to the first memory node and the second memory node and prior to deactivating the reset transistor, controlling, by the control circuit, the reset transistor and the first voltage supply rail to apply an initial voltage to the capacitive SN while the first memory node of the first pixel and the second memory node of the second pixel are insulated from the capacitive SN by the first transfer gate and the second transfer gate.

15. The method of claim 13, wherein:
the first pixel further comprises a third transfer gate coupling the first memory node of the first pixel to a first input node of the first pixel, and
the second pixel further comprises a fourth transfer gate coupling the second memory node of the second pixel to a second input node of the second pixel, and
wherein storing the electrical charge at the first memory node and the second memory node further comprises, prior to activating the reset transistor:
controlling, by the control circuit, the third transfer gate of the first pixel to prevent transfer of the electrical charge between the first memory node of the first pixel and the first input node of the first pixel; and
controlling, by the control circuit, the fourth transfer gate of the second pixel to prevent transfer of the electrical charge between the second memory node of the second pixel and the second input node of the second pixel.

16. The method of claim 15, wherein:
the first pixel further comprises a first constant potential barrier separating the first memory node of the first pixel from the third transfer gate of the first pixel; and
the second pixel further comprises a second constant potential barrier separating the second memory node of the second pixel from the fourth transfer gate of the second pixel,
wherein storing the electrical charge at the first memory node and the second memory node further comprises, prior to controlling the first transfer gate of the first pixel and the second transfer gate of the second pixel to transfer the electrical charge stored at the first memory node and the second memory node to the capacitive SN:
controlling, by the control circuit, the third transfer gate of the first pixel to obtain a transfer of a first partial amount of the electrical charge stored at the first memory node of the first pixel, over the first constant potential barrier, to the first input node of the first pixel; and
controlling, by the control circuit, the fourth transfer gate of the second pixel to obtain a transfer of a second partial amount of the electrical charge stored at the second memory node of the second pixel, over the second constant potential barrier, to the second input node of the second pixel.

17. The method of claim 16, wherein:
the first pixel further comprises a fifth transfer gate coupling a second voltage supply rail to the first input node of the first pixel; and
the second pixel further comprises a sixth transfer gate coupling the second voltage supply rail to the second input node of the second pixel,
wherein storing the electrical charge at the first memory node and the second memory node further comprises, prior to controlling the first transfer gate of the first pixel and the second transfer gate of the second pixel to transfer the electrical charge stored at the first memory node and the second memory node to the capacitive SN:
controlling, by the control circuit, the fifth transfer gate and the second voltage supply rail of the first pixel to transfer the first partial amount of the electrical charge from the first input node of the first pixel to the second voltage supply rail, and
controlling, by the control circuit, the sixth transfer gate and the second voltage supply rail of the second pixel to transfer the second partial amount of the electrical charge from the second input node of the second pixel to the second voltage supply rail.

18. The method of claim 13, wherein:
the first pixel comprises a first diode,
the second pixel comprises a second diode, a first anode of the first diode and a second anode of the second diode are coupled to a ground potential, a first cathode of the first diode of the first pixel is coupled to the first memory node of the first pixel, and a second cathode of the second diode of the second pixel is coupled to the second memory node of the second pixel.

19. The method of claim 13, wherein:

the first pixel comprises a first photodiode, the second pixel comprises a second photodiode, a first anode of the first photodiode and a second anode of the second photodiode is coupled to a further voltage supply rail, a first cathode of the first photodiode of the first pixel is coupled to a first input node of the first pixel, and a second cathode of the second photodiode of the second pixel is coupled to a second input node of the second pixel.

20. An image sensor comprising:

a ramp generator comprising a digital to analog converter (DAC);

an array of pixels configured to transform incoming light into an output signal representative of an amount of incoming light, the array of pixels each having respective outputs coupled together to an impedance buffer and to a common sensor conduction rail; and a comparator having a first input capacitively coupled to a DAC buffer conduction rail of the DAC and a second inverting input capacitively coupled to the sensor conduction rail, wherein the comparator is configured to provide, at an output of the comparator, a first signal indicating when a second signal on the DAC buffer conduction rail crosses a third signal on the sensor conduction rail, wherein:

the ramp generator is configured to generate, on the DAC buffer conduction rail, a monotonically increasing or monotonically decreasing voltage ramp, and the image sensor further comprises a second ramp generator comprising a second DAC and configured to generate an offset voltage ramp on an offset ramp rail capacitively coupled to the second inverting input of the comparator, the offset voltage ramp being either a monotonically increasing voltage ramp when the voltage ramp on the DAC buffer conduction rail is monotonically increasing, or a monotonically decreasing voltage ramp when the voltage ramp on the DAC buffer conduction rail is monotonically decreasing.

* * * * *